United States Patent
Ionescu

(10) Patent No.: US 6,301,068 B1
(45) Date of Patent: Oct. 9, 2001

(54) PROGRAMMABLE WRITE CURRENT WAVEFORM FOR HIGH FREQUENCY MAGNETIC RECORDING

(75) Inventor: Stefan A. Ionescu, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/346,481

(22) Filed: Jul. 1, 1999

Related U.S. Application Data
(60) Provisional application No. 60/091,553, filed on Jul. 2, 1998.

(51) Int. Cl.[7] .................................................... G11B 5/02
(52) U.S. Cl. .............................................. 360/68; 360/40
(58) Field of Search ................................ 360/46, 67, 68, 360/40

(56) References Cited

U.S. PATENT DOCUMENTS

| | | | |
|---|---|---|---|
| 3,267,483 | * 8/1966 | Gabor | 360/68 |
| 3,618,119 | * 11/1971 | Rodriguez | 360/46 |
| 3,665,485 | * 5/1972 | Pear, Jr. | 360/40 |
| 5,287,231 | 2/1994 | Shier et al. | 360/68 |
| 5,600,500 | 2/1997 | Madsen et al. | 360/46 |
| 5,687,036 | 11/1997 | Kassab | 360/53 |
| 5,790,336 | * 8/1998 | Voorman et al. | 360/68 |
| 5,822,141 | 10/1998 | Chung et al. | 360/46 |
| 5,841,603 | 11/1998 | Ramalho et al. | 360/68 |
| 5,869,988 | 2/1999 | Jusuf et al. | 327/110 |

* cited by examiner

Primary Examiner—David Hudspeth
Assistant Examiner—Dan I. Davidson
(74) Attorney, Agent, or Firm—Westman, Champlin & Kelly, P.A.

(57) ABSTRACT

A method of writing data to a magnetic data storage medium is provided. A peak amount of write current is provided to the transducer, after which the amount of write current is reduced to a second amount of write current, lower than the peak amount. In one embodiment, the second amount of write current is then maintained at a steady state value. In one embodiment, the magnitude of the steady state value is greater than the magnitude of the critical current. In one embodiment the magnitude and duration of the peak write current for each transducer are stored in memory and retrieved when the corresponding transducer is selected. Also provided is a disc drive adapted to implement the aforementioned methods.

7 Claims, 6 Drawing Sheets

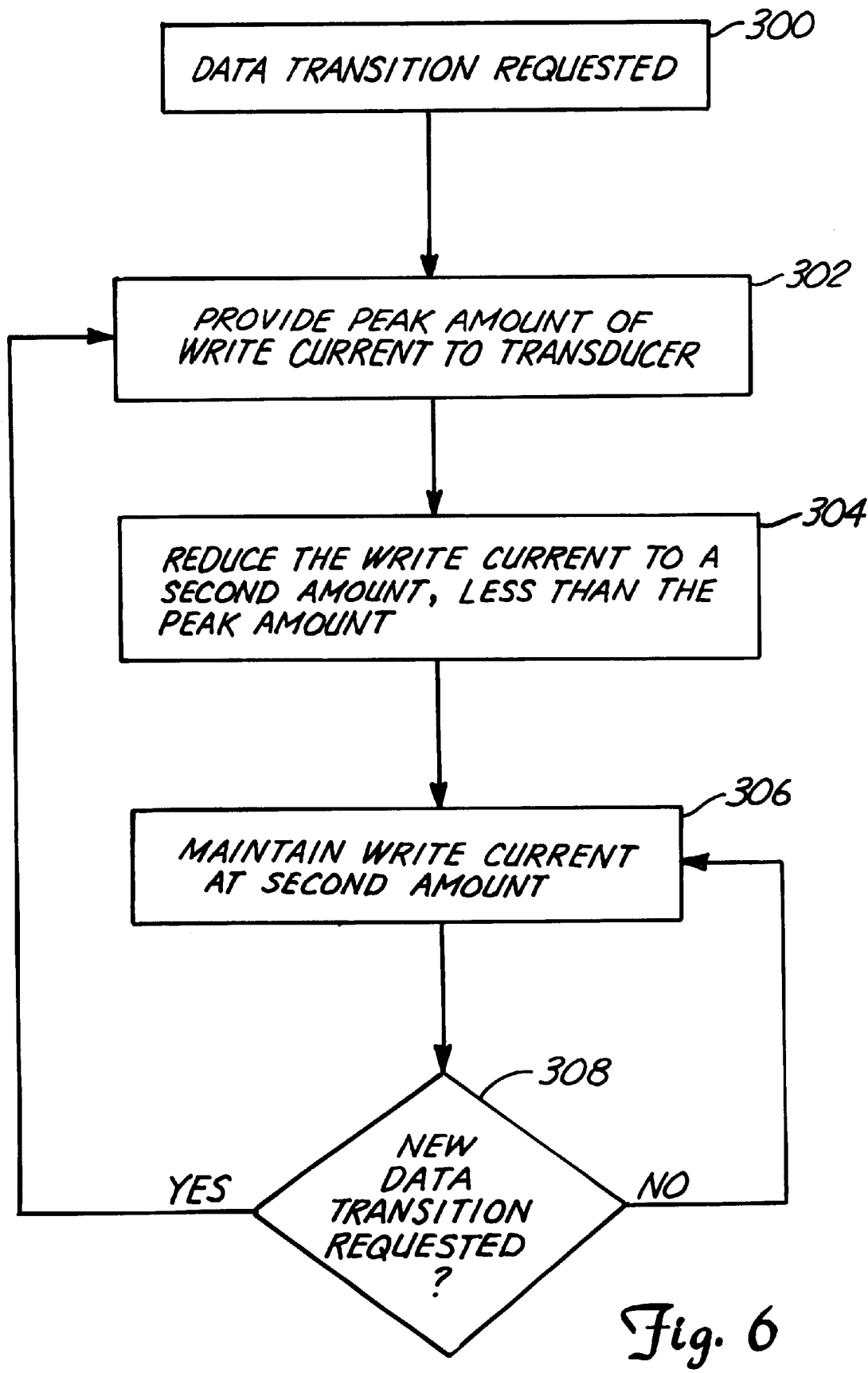

PROGRAMMABLE WRITE CURRENT WAVEFORM FOR HIGH FREQUENCY MAGNETIC RECORDING

CROSS-REFERENCE TO CO-PENDING APPLICATION

This application claims the benefit of U.S. Provisional Patent Application No. 60/091,553, entitled "PROGRAMMABLE WRITE CURRENT WAVEFORM FOR HIGH FREQUENCY MAGNETIC RECORDING," filed on Jul. 2, 1998.

FIELD OF THE INVENTION

The present invention relates generally to disc drive data storage systems. More particularly, the present invention relates to methods of, and apparatus for, writing data to magnetic media at high speeds.

BACKGROUND OF THE INVENTION

A typical disc drive includes a drive controller, an actuator assembly and one or more magnetic discs mounted for rotation on a hub or spindle. The drive controller controls the disc drive based on commands received from a host system. The drive controller controls the disc drive to retrieve information from the magnetic discs and to store information on the magnetic discs. The actuator assembly includes an actuator coupled to the drive controller and an actuator arm for supporting a head-gimbal assembly over each magnetic disc. The headgimbal assembly carries a data head comprising a hydrodynamic air bearing and a transducer for communicating with the surface of the disc.

The actuator operates with the drive controller in a servo system. The actuator moves the data head radially over the disc surface for track seek operations and holds the transducer directly over a desired track on the disc surface for track following operations.

The transducer includes an inductive coil which reads data from and writes data to the magnetic disc by sensing or creating a changing magnetic field. A read/write preamplifier is connected to the transducer at first and second head contacts. The preamplifier includes a read circuit and a write circuit for controlling the read and write operations. The write circuit includes a write driver circuit which is connected across the head contacts. During write mode operation, the write driver circuit forces a write current through the inductive coil to create a magnetic field that polarizes adjacent bit positions on the recording surface. Digital information is stored by reversing the direction of the current flow in the inductive coil. This reverses the polarity of the magnetic field induced in the coil. This reversing of the polarity of the magnetic field in the coil is referred to as a flux reversal. Each flux reversal in turn reverses the polarization of selected bit positions. Each flux reversal represents a change from a logical "1" to a logical "0" or from a logical "0" to a logical "1". The reversal of the direction of the write current flow in the transducer, and the corresponding flux reversal and reversal of the polarization of the recording surface, is referred to as a data transition or simply a transition.

The write driver circuit controls the direction of current flow through the inductive coil. The write driver circuit applies a limited voltage swing across the head contacts for reversing current flow and polarizing the adjacent bit position. The rate at which information can be stored on a recording surface through the magnetic head is directly proportional to the rate at which the direction of current can be reversed in the inductive coil. The length of time between two consecutive data transitions is referred to as the transition spacing. For a good write process, it is desirable to deliver a large swing in the write current in a time substantially shorter than the minimum transition spacing for the desired transfer rate. In other words, it is desirable to produce short rise times and fall times.

The strength of the magnetic field produced by the transducer which is required to switch the polarity of the magnetic medium is called the critical field. In turn, the amount of write current through the transducer which is required to produce the critical field is called the critical current. For a good write process, it is desirable that the write current have a very sharp gradient at the critical current.

Historically, the write current target waveform has been as illustrated in FIG. 1. FIG. 1 shows the ideal write current $I_{WI}$ 100, the actual write current $I_{WA}$ 102 and the magnetic field H 104 produced by the transducer as a function of time t 106. The ideal write current $I_{WI}$ 100 is a square wave having a magnitude slightly greater than the critical current $I_C$. However, the inherent capacitance of the transducer and the inductance of the transducer limit the rate at which the current in the transducer can change. Thus, the actual write current $I_{WA}$ waveform 102 has a finite rise time $t_{ri}$ 108 and fall time $t_{fi}$ 110 as shown in FIG. 1. FIG. 1 also shows the magnetic field H 104 induced in the transducer by the write current $I_{WA}$ 102. As can be seen in FIG. 1, at high speeds the response of the transducer is not fast enough for the magnetic field response H 104 to track the shape of the write current waveform $I_{WA}$ 102. Thus, the magnetic field H 104 produced by the transducer has a relatively high rise time $t_{rh}$ 112 and fall time $t_{fh}$ 114. Furthermore, at high data transfer rates, the gradient of the induced magnetic field H 104 at the critical field values $H_C$ are relatively low.

As data transfer rates have increased, one method used in previous art to compensate for the inability of the recording transducer to track the shape of the write current waveform was to increase the amplitude of the write current, as shown in FIG. 2. FIG. 2 shows the ideal write current $I_{WI}$ 116, the actual write current $I_{WA}$ 118 and the magnetic field H 120 produced by the transducer as a function of time t 106. The increased amplitude of the actual write current $I_{WA}$ 118 results in a shorter write current rise time $t_{ri}$ 122 and fall time $t_{fi}$ 124, and in turn a shorter magnetic field rise time $t_{rh}$ 126 and fall time $t_{fh}$ 128. The increased write current amplitude also results in a sharper gradient in the write current $I_{WA}$ 118 at the desired critical current $I_C$, which in turn results in a sharper gradient in the induced field H at the critical field value $H_C$. However, this method has the drawback that the transducer is deeply saturated at lower frequencies by the excessive write current. This magnetic saturation slows down the subsequent field reversal.

Another approach used in the prior art to reduce the rise and fall times and increase the gradient of the induced magnetic field is to reduce the damping of the transducer. This method has the drawback that the write current could ring excessively at the resonant frequency of the transducer when the next flux reversal is desired. This resonance can interfere with the next data transition, as the write current needs to be well settled prior to switching the direction of the current to ensure a proper flux reversal. Such an interference in one write signal which interferes with the transition to a new state is known as intersymbol interference (ISI).

There is a continuing need to reduce the rise and fall times of the transducer write field and increase the gradient of the write field at the critical field without strongly saturating the transducer core and without introducing excessive resonance in the write current.

The present invention provides a solution to this and other problems and offers other advantages over the prior art.

SUMMARY OF THE INVENTION

The present invention relates to methods and apparatus for reducing the rise and fall times of the transducer write field and increasing the gradient of the write field at the critical field without strongly saturating the transducer core and without introducing excessive resonance in the write current.

One embodiment of the present invention is directed to a method of writing data to a magnetic data storage medium. First, a first amount of write current is provided to a transducer positioned near the data storage medium. After providing the first amount of write current, the amount of write current provided to the transducer is reduced to a second amount of write current of the same polarity as the first amount. The second amount of write current is lower than the first amount but higher than an amount of write current needed to sustain the polarity of a bit of data on the magnetic medium. The second amount of write current is then maintained at a steady state value.

According to another method of writing data to a magnetic data storage medium according to the present invention, a transducer is positioned next to the magnetic data storage medium and a multilevel electrical write pulse is provided to the transducer. The write pulse has a peak value and a steady state value that is lower than the peak value. The steady state value occurs after the peak value. In one embodiment, the magnitude of the steady state value is greater than or equal to the magnitude of write current required to sustain the polarity of a bit of data on the magnetic data storage medium.

Another embodiment of the present invention is directed to a disc drive that includes at least one magnetic disc, at least one transducer and at least one write circuit. The transducer writes data to a surface of a magnetic disc. The write circuit provides a write pulse to the transducer. The write pulse has a peak value and a steady state value. The peak value occurs before the steady state value during a transient in the write pulse and has a greater magnitude than the steady state value.

These and various other features as well as advantages which characterize the present invention will be apparent upon reading of the following detailed description and review of the associated drawings.

BRIEF DESCRIPTION OF THE DRAWINGS

FIG. 6 is a flow chart representing a method of writing data to a magnetic data storage medium according to an illustrative embodiment of the present invention.

DETAILED DESCRIPTION OF ILLUSTRATIVE EMBODIMENTS

Figure 3:
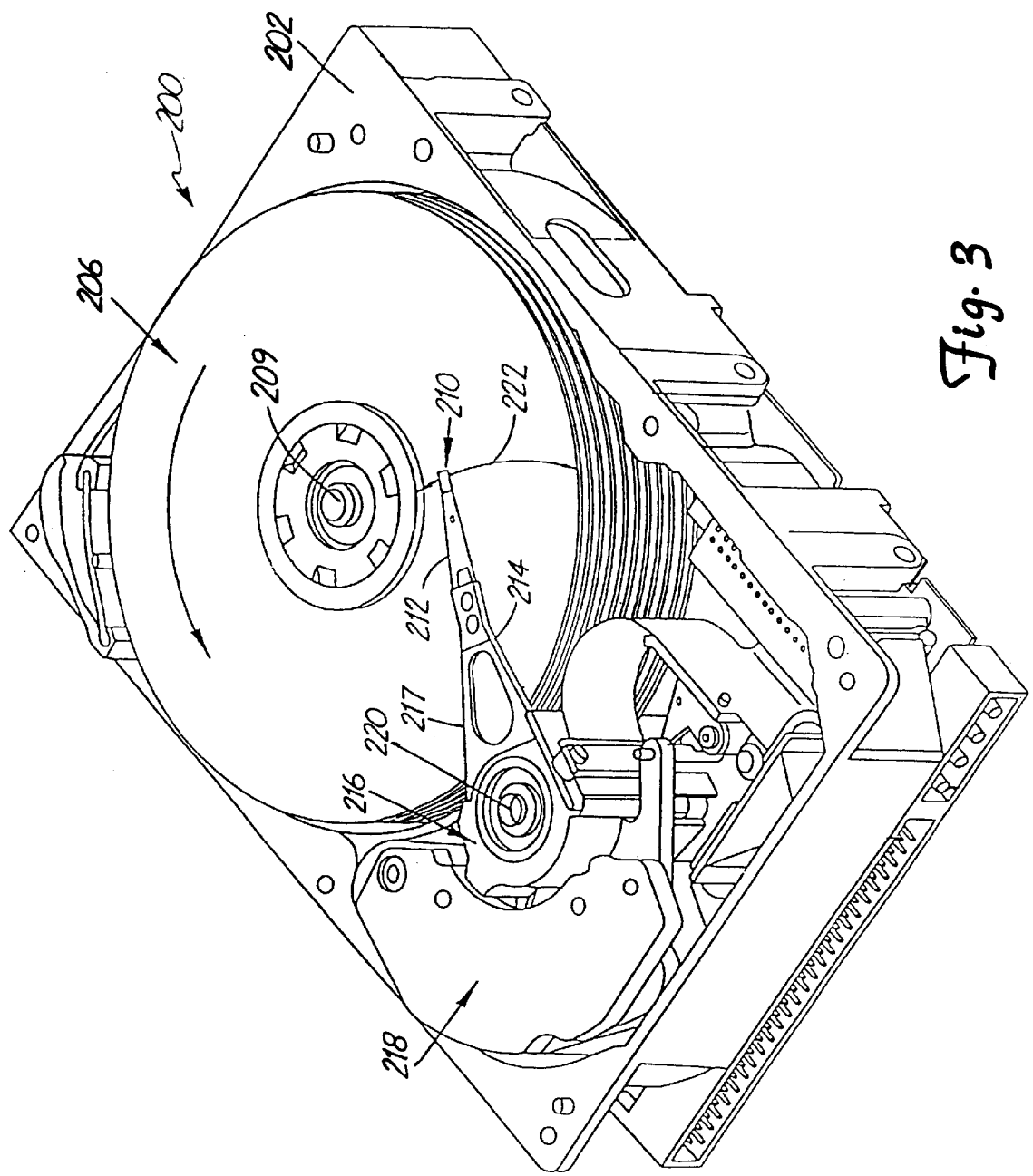
FIG. 3 is a top view of a disc drive in accordance with one embodiment of the present invention.

FIG. 3 is a top view of a disc drive 200 in accordance with one embodiment of the present invention. Disc drive 200 includes a disc pack 206 mounted for rotation about spindle 209. Disc pack 206 includes a plurality of individual discs, each of which include concentric tracks, or cylinders, for receiving and storing data in the form of magnetic flux reversals encoded on the tracks. Disc drive 200 also includes an actuator 216 mounted to a base 202 and pivotally moveable relative to discs 206 about pivot shaft 220. Actuator 216 includes an actuator arm assembly 217 which includes a plurality of actuator arms 214. Each actuator arm 214 is attached to one or more flexure arms 212. Each flexure arm 212 supports a data head 210. Data head 210 includes an air bearing, or slider, which supports a transducer for reading information from and encoding information to one of the discs 206. In an illustrative embodiment, actuator 216 includes a voice coil motor, shown generally at 218. Disc drive 200 further includes a drive controller (not shown) which is coupled to a host system or another controller which controls a plurality of drives. In an illustrative embodiment, the drive controller is a microprocessor, or digital computer. The drive controller is either mountable within disc drive 200, or is located outside of disc drive 200 with suitable connection to actuator 216.

During operation, the drive controller receives position information indicating a track of the disc 206 to be accessed. The drive controller receives the position information from an operator, from a host computer, or from another suitable controller. Based on the position information, the drive controller provides a position signal to actuator 216. The position signal causes actuator 216 to pivot about pivot shaft 220. In an illustrative embodiment, the position signal comprises a current supplied to the voice coil motor 218, causing actuator 216 to pivot about pivot shaft 220. This, in turn, causes data head 210 to move radially over the surface of the disc 206 in a generally arcuate path indicated by arrow 222.

Figure 4:
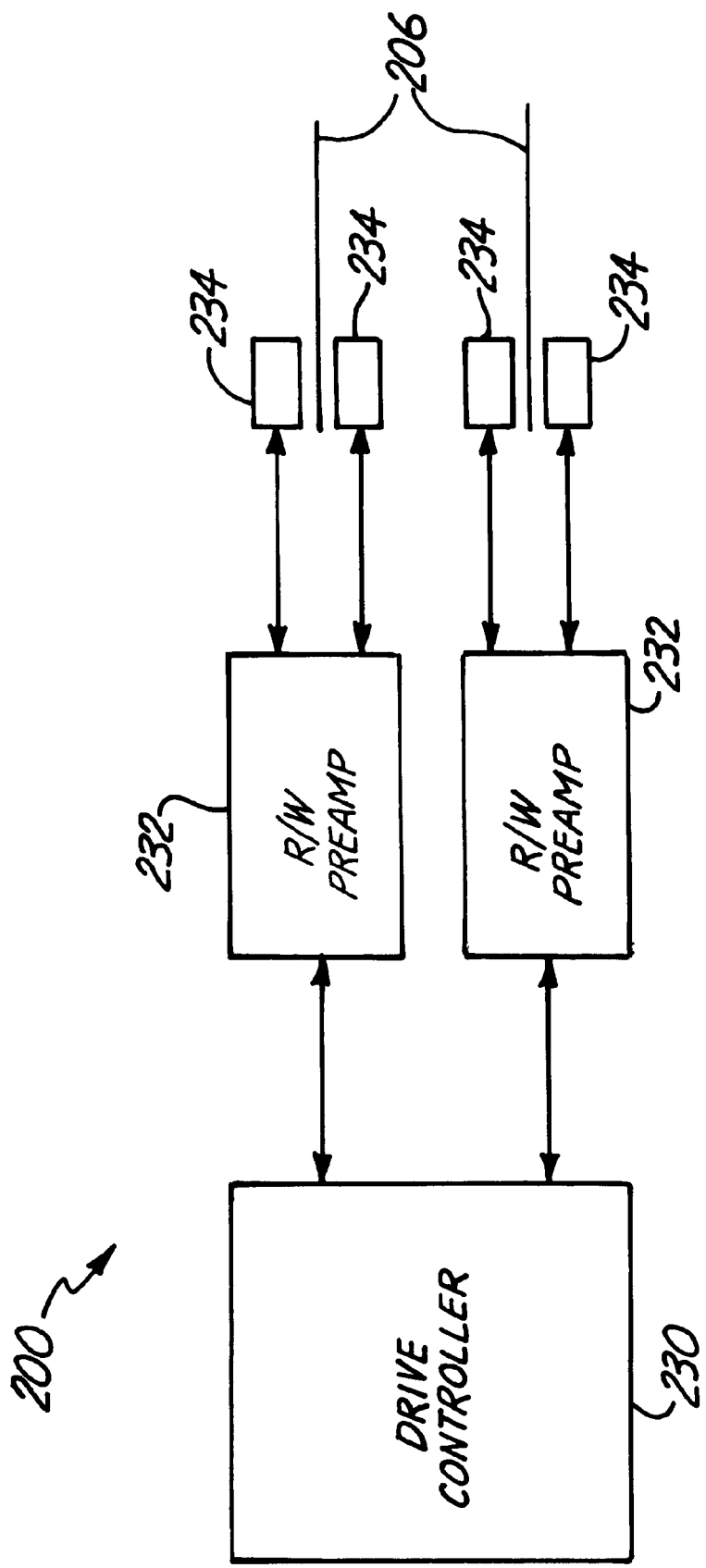
FIG. 4 is a simplified block diagram of a disc drive in accordance with one embodiment of the present invention.

FIG. 4 is a simplified block diagram of disc drive 200, showing the interrelationship between drive controller 230, read/write preamplifiers 232, transducers 234 and discs 206 according to an illustrative embodiment of the present invention. Drive controller 230 communicates with at least one read/write preamplifier 232. Each preamplifier 232 communicates with at least one transducer 234. It should be noted that although FIG. 4 shows two read write preamplifiers 232, each of which communicates with two transducers, a disc drive in accordance to the present invention may include any number of read/write preamplifiers 232 and any number of transducers 234. Transducers 234 read information from and encode information to an associated surface of one of discs 206. Each transducer 234 includes an inductive coil which writes data to the magnetic disc 206 by creating a changing magnetic field. A read/write preamplifier 232 is connected to the transducer 234 at first and second head contacts. The preamplifier 234 includes a read circuit and a write circuit for controlling the read and write operations. The write circuit includes a write driver circuit which is connected across the head contacts.

During operation, drive controller 230 receives instructions for one or more of transducers 234 to read from or write to a surface of one or more of discs 206. Drive controller 230 then provides a signal to the preamplifier 232 that is associated with the selected transducer 234. Said signal indicates which transducer 234 is to be accessed and whether a read or write operation is to be performed. If a write operation is requested, drive controller 230 provides the data to be written to the appropriate preamplifier 232. The write circuit of read/write preamplifier 232 then forces a write current through the inductive coil of transducer 234 to create a magnetic field that polarizes adjacent bit positions on the surface of disc 206. Digital information is stored by reversing the direction of the current flow in the inductive coil. This reverses the polarity of the magnetic field induced in the coil. This flux reversal in turn reverses the polarization of selected bit positions. Each flux reversal represents a change from a logical "1" to a logical "0" or from a logical "0" to a logical "1". The write circuit controls the direction of current flow through the inductive coil. The write circuit applies a limited voltage swing across the head contacts for reversing current flow and polarizing the adjacent bit position.

Figure 1:
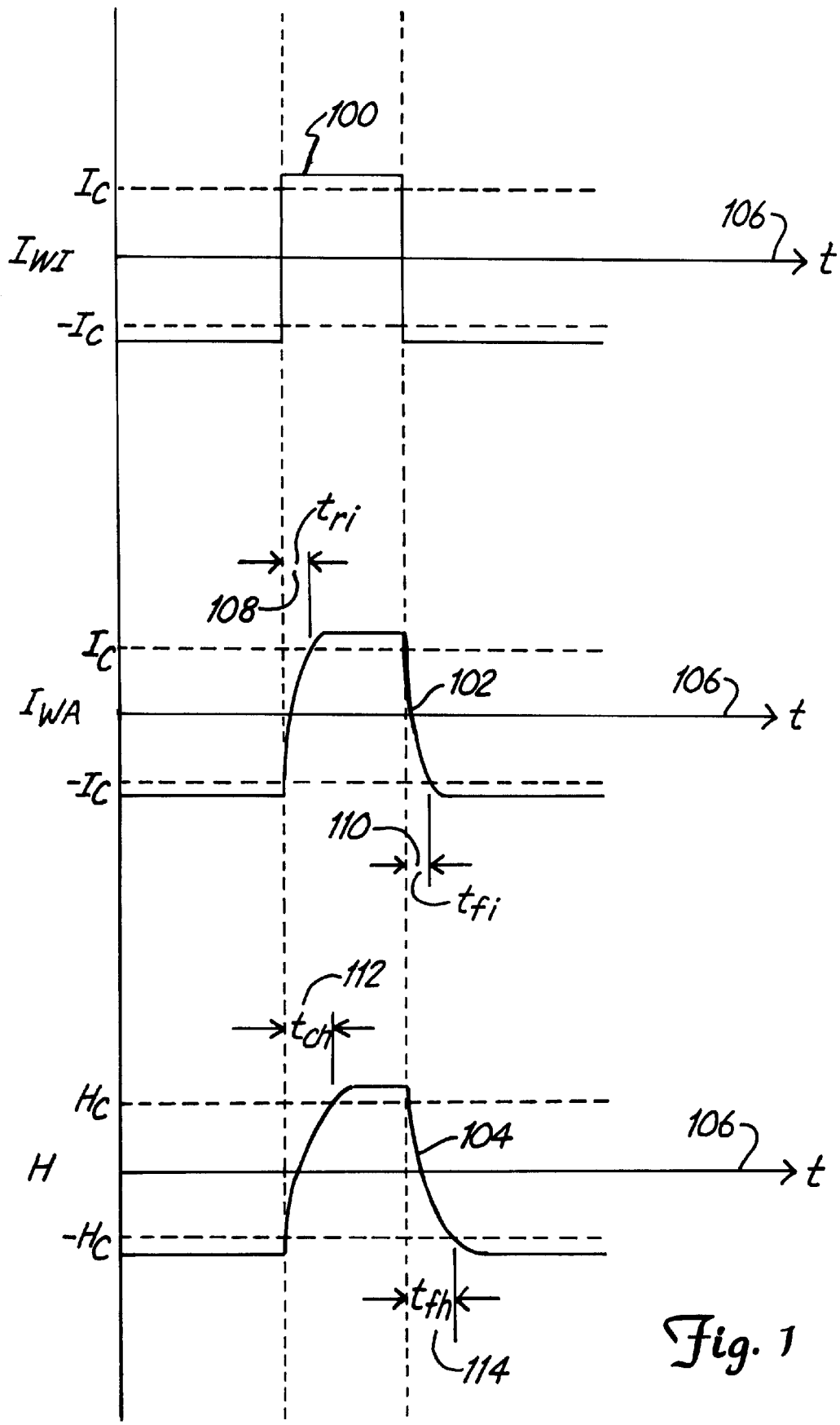
FIG. 1 is a graph showing write current waveforms and a magnetic field waveform in accordance with the prior art.
Figure 2:
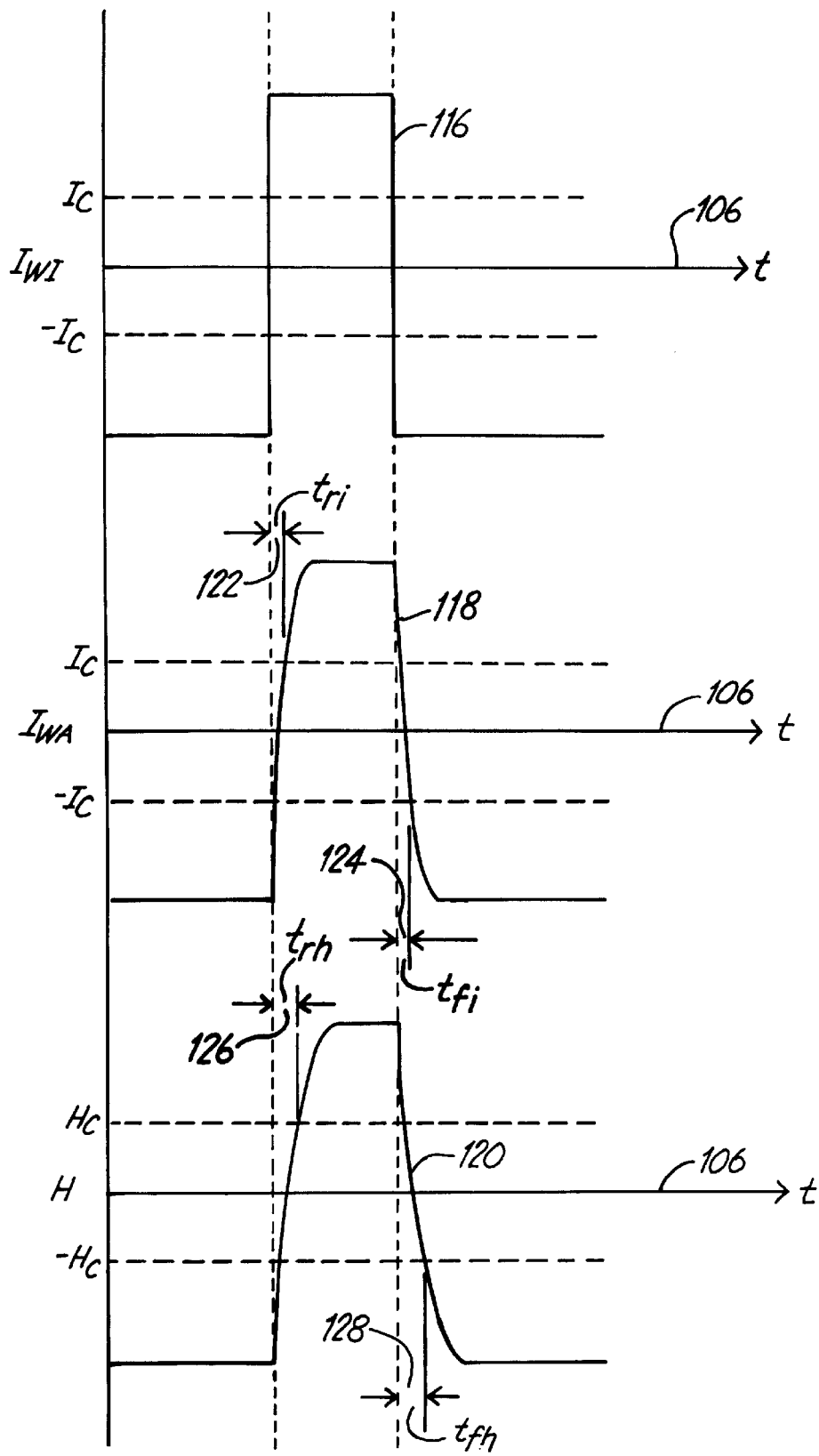
FIG. 2 is a graph showing write current waveforms and a magnetic field waveform in accordance with the prior art.
Figure 5:
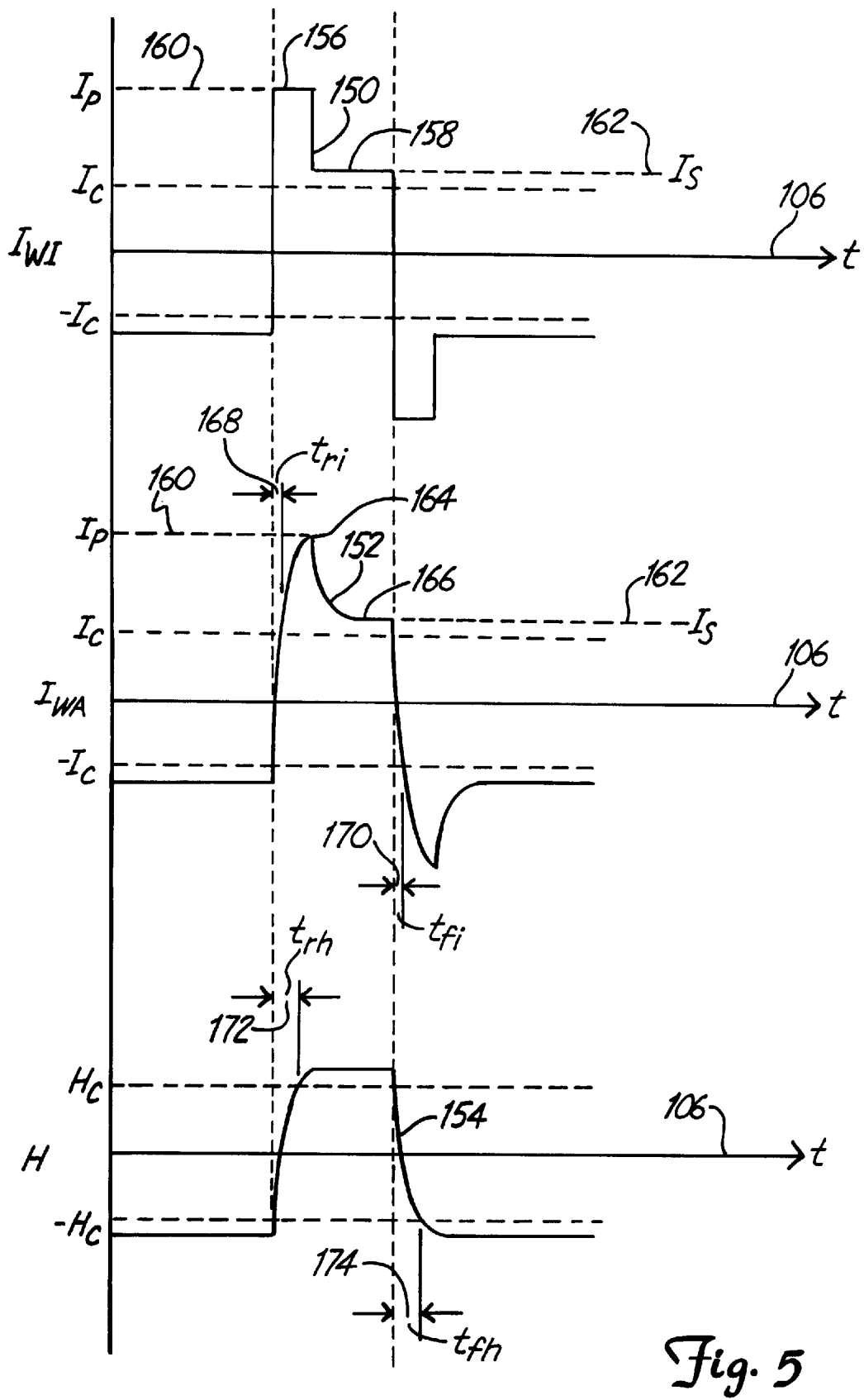
FIG. 5 is a graph showing write current waveforms and a magnetic field waveform in accordance with one embodiment of the present invention.

According to an illustrative embodiment of the present invention, the write circuit of read/write preamplifier 232 produces a write current as shown in FIG. 5. FIG. 5 shows the ideal write current $I_{WI}$ 150, the actual write current $I_{WA}$ 152 and the magnetic field H 154 produced by the transducer 234 as a function of time t 106, in accordance with an illustrative embodiment of the present invention. The ideal write current $I_{WI}$ 150 is a two-level square wave. The first portion 156 of the ideal write pulse $I_{WI}$ 150 has a magnitude $I_P$ 160 which is significantly greater than the critical current $I_C$. In an illustrative embodiment of the present invention, the magnitude 160 of the first portion 156 of the write pulse $I_{WI}$ 150 is equivalent to the magnitude of the ideal write current $I_{WI}$ 116 of the prior art method depicted in FIG. 2. The second portion 158 of the ideal write pulse $I_{WI}$ 150 is of the same polarity as the first portion 156 of the write pulse $I_{WI}$ 150 and has a magnitude $I_S$ 162 which is significantly lower than the magnitude $I_P$ 160 of the first portion 156 of the write pulse $I_{WI}$ 150, but which is high enough to maintain the written transition. In the illustrative embodiment shown in FIG. 5, the magnitude $I_S$ 162 of the second portion 158 of the ideal write pulse $I_{WI}$ 150 is greater than the magnitude of the critical current $I_C$. However, it is not necessary for the magnitude $I_S$ 162 of the second portion 158 of the ideal write pulse $I_{WI}$ 150 to be greater than the magnitude of the critical current $I_C$. The magnitude $I_S$ 162 of the second portion 158 of the ideal write pulse $I_{WI}$ 150 need only be high enough to maintain the written state of the bit of data on the magnetic medium 206.

The inherent capacitance of the transducer 234 and the inductance of the transducer 234 limit the rate at which the current in the transducer 234 can change. Therefor, the actual write current $I_{WA}$ 152 according to an illustrative embodiment of the present invention is as shown in FIG. 5. Like the ideal waveform $I_{WI}$ 150, the actual write current $I_{WA}$ 152 has two distinct portions, although with the actual waveform $I_{WA}$ 152 a finite amount of time is required to attain the respective current levels. As can be seen in FIG. 5, when a data transition is desired, a peak current 164 is supplied to the transducer 234. This peak current 164 has a magnitude $I_P$ 160 which is substantially greater than the critical current $I_c$. In an illustrative embodiment of the present invention, the magnitude 160 of the peak current 164 of the write pulse $I_{WA}$ 152 is equivalent to the magnitude of the actual write current $I_{WA}$ 118 of the prior art method depicted in FIG. 2. This increased amount of write current $I_{WA}$ 152 is delivered for a time shorter than the minimum transition spacing. The increased amount of write current $I_{WA}$ 152 during the data transition results in a shorter write current rise time $t_{ri}$ 168 and fall time $t_{fi}$ 170. The increased write current $I_{WA}$ 152 further results in an increased gradient in the write current $I_{WA}$ 152 at the critical current $I_C$.

As seen in FIG. 5, after the peak current 164 is provided to the transducer 234, the amount of current $I_{WA}$ 152 provided to the transducer is reduced to a steady state current 166 having the same polarity as the peak current 164 and having a magnitude $I_S$ 162 which is significantly lower than the magnitude $I_P$ 160 of the peak current 164 of the write pulse $I_{WA}$ 150, but which is high enough to maintain the written transition. In the illustrative embodiment shown in FIG. 5, the magnitude $I_S$ 162 of the steady state current 166 is greater than the magnitude of the critical current $I_C$. However, it is not necessary for the magnitude $I_S$ 162 of the steady state current 166 to be greater than the magnitude of the critical current $I_C$. The magnitude $I_S$ 162 of the steady state current 166 need only be high enough to maintain the written state of the bit of data on the magnetic medium 206. The magnitude $I_S$ 162 of the steady state current 166 may be dictated by the head/media combination and the write method used.

In the illustrative embodiment shown in FIG. 5, the write current $I_{WA}$ is reduced as soon as the write current $I_{WA}$ reaches the peak value $I_P$ 160. In an alternative embodiment, the peak current 164 is maintained at or near the peak value $I_P$ for a predetermined length of time prior to reducing the write current $I_{WA}$ 152 to the steady state value $I_S$.

In an illustrative embodiment of the present invention, the magnitude $I_P$ 160 of the peak write current 164 is greater than or equal to twice the magnitude of the critical current $I_C$. In a further illustrative embodiment, the magnitude $I_P$ 160 of the peak write current 164 is approximately equal to twice the magnitude $I_S$ 162 of the steady state write current 166.

Providing the transducer 234 with the write current waveform $I_{WA}$ 152 shown in FIG. 5 results in a magnetic field H 154 coming out of the transducer 234 having the response characteristics as shown in FIG. 5. When the magnitude of the magnetic field H 154 reaches the critical field $H_C$, the data bit is written to the magnetic medium 206. The increased amount of write current $I_{WA}$ 152 during the data transition results in a shorter magnetic field rise time $t_{rh}$ 172 and fall time $t_{fh}$ 174. The increased peak current 164 further results in an increased gradient in the write current H at the critical field $H_C$. Reducing the write current $I_{WA}$ 152 to steady state value $I_S$ 162 prevents the magnetic field H out of the transducer 234 from rising significantly past the critical field $H_C$. This prevents the transducer 234 from becoming magnetically saturated, thereby maintaining the high speed of the flux reversals.

FIG. 6 is a flow chart representing a method of writing data to a magnetic data storage medium according to an illustrative embodiment of the present invention. At block 300, a data transition is requested by the drive controller 230. At block 302, the write circuit of read/write preamplifier 232 provides a peak amount of write current to transducer 234. At block 304, the write circuit reduces the amount of write current provided to the transducer 234 to a second amount of write current, less than the peak amount of write current. At block 306, the write circuit maintains the second amount of write current provided to the transducer 234. At item 308, it is queried whether a new data transition has been requested. If a new data transition has been requested, a peak amount of current is again provided to the transducer 234, as called for in block 302. Note that the polarity of the write current here applied to the transducer 234 will be opposite the polarity of the previously applied write current. If at item 308 a new data transition is not requested, the write circuit continues to provide the transducer 234 with the second amount of write current, as called for in block 306.

In an illustrative embodiment of the present invention, the magnitude $I_P$ 160 and the duration of the peak current 164 are programmable, that is, stored in computer memory. In one embodiment, this computer memory resides in the read/write preamplifier 232. Illustratively, separate values of the magnitude $I_P$ 160 and the duration of the peak current 164 are stored for each transducer 234. In operation, when a given transducer is selected for writing, the corresponding magnitude $I_P$ 160 and duration of the peak current 164 are retrieved from memory and the write current is provided to the transducer according to these values. Pursuant to this embodiment, the optimum values of the magnitude $I_P$ 160 and duration of the peak current 164 for each transducer 234 are illustratively determined experimentally during the manufacture of the disc drive 200.

There are trade-offs to be made between the amplitude $I_P$ 160 and the duration of the overshoot. The values used for the amplitude $I_P$ 160 and the duration of the overshoot depend on the head/media combination and the desired transfer rate. Generally, the higher the amplitude $I_P$ 160 of the overshoot, the longer it takes for the write current to settle to the steady state value $I_S$ 162. The interconnect between the write driver and the transducer will also contribute to the final shape of the write current entering the transducer proper. For example, sometimes it is desirable to use a lower impedance interconnect. This reduces the rise time $t_{ri}$ 168 and fall time $t_{rf}$ 170 but increases the amount of time required for the write current $I_{WA}$ 152 to settle to its steady state value $I_S$ 162. Having the ability to control the duration of the overshoot could compensate for this increased settling time. Thus, depending on what the desired optimization target is, either the duration or the amplitude of the overshoot, or both, may be programmed.

The present invention offers many advantages over the prior art beyond those heretofore discussed as part of the description of the illustrative embodiments. For example, the increase in the gradient of the transducer output field H reduces the amount of noise generated in the recording media. Also, by optimizing the high frequency response of the recording process, the overwrite capability of a particular transducer/media combination is improved. Overwrite capability is the capability of the transducer to write new data over previously written data on the disc surface. Thus, improving the overwrite capability reduces the previously written data's effect on the newly written data. Additionally, by eliminating the need for a large steady state write current, the magnitude of the erase band could be reduced.

Furthermore, by having the amplitude and the duration of the write current overshoot properly adjusted, intersymbol interference (ISI) is also reduced. Still another advantage of the present invention is that, by reducing the steady state value of the write current, the size of the devices used in the write driver circuit can also be reduced. This results in lower parasitics and therefor smaller resonant frequency of the circuit comprised of the write driver and the transducer. This acts favorably toward the goal of increasing the transfer rate.

In summary, one embodiment of the present invention is directed to a method of writing data to a magnetic data storage medium 206. First, a first amount of write current $I_P$ 160 is provided to a transducer 234 positioned near the data storage medium 206. After providing the first amount of write current $I_P$ 160, the amount of write current $I_{WA}$ 152 provided to the transducer 234 is reduced to a second amount of write current $I_S$ 162 of the same polarity as the first amount $I_P$ 160. The second amount of write current $I_S$ 162 is lower than the first amount $I_P$ 160 but higher than an amount of write current needed to sustain the polarity of a bit of data on the magnetic medium 206. The second amount of write current $I_S$ 162 is then maintained at a steady state value.

According to another method of writing data to a magnetic data storage medium 206 according to the present invention, a transducer 234 is positioned next to the magnetic data storage medium 206 and a multilevel electrical write pulse $I_{WA}$ 152 is provided to the transducer 234. The write pulse $I_{WA}$ 152 has a peak value $I_P$ 160 and a steady state value $I_S$ 162 that is lower than the peak value $I_P$ 160. The steady state value $I_S$ 162 occurs after the peak value $I_P$ 160. In one embodiment, the magnitude of the steady state value $I_S$ 162 is greater than the magnitude of write current required to sustain the polarity of a bit of data on the magnetic data storage medium 206.

Another embodiment of the present invention is directed to a disc drive 200 that includes at least one magnetic disc 206, at least one transducer 234 and at least one write circuit. The transducer 234 writes data to a surface of a magnetic disc 206. The write circuit provides a write pulse $I_{WA}$ 152 to the transducer 234. The write pulse $I_{WA}$ 152 has a peak value $I_P$ 160 and a steady state value $I_S$ 162. The peak value $I_P$ 160 occurs before the steady state value $I_S$ 162 during a transient in the write pulse $I_{WA}$ 152 and has a greater magnitude than the steady state value $I_S$ 162.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, a disc drive in accordance with the present invention may include any number of preamplifiers, each of which communicate with any number of data heads. Further, aspects of the invention are also applicable to optical storage technologies such as magneto-optic devices. Other medium configurations, such as magnetic tape, can also be used. Other modifications can also be made.

What is claimed is:

1. A method of writing data to a surface of a magnetic disc in a disc drive, comprising steps of:
    (a) storing a magnitude and a duration of a peak value of a multilevel electrical write pulse in a computer memory within the disc drive;
    (b) retrieving the magnitude and the duration of the peak value of the multilevel write pulse from the computer memory when a transducer is selected for writing;
    (c) positioning the transducer adjacent the surface of the magnetic disc;
    (d) providing the multilevel electrical write pulse to the transducer, the multilevel write pulse having a steady state value of lesser magnitude than the peak value, the steady state value occurring after the peak value; and
    (e) providing a reversed polarity multilevel electrical write pulse to the transducer which is substantially symmetrical to the multilevel electrical write pulse when a change in a polarity of data is desired.

2. The method of claim 1 wherein the magnitude of the steady state value is greater than or equal to a magnitude of write current required to sustain the polarity of a bit of data on the surface of the magnetic disc.

3. The method of claim 1 wherein both the peak value of the multilevel electrical write pulse and the steady state value of the write pulse occur within a minimum transition spacing of a write current.

4. The method of claim 1 wherein a magnitude of the peak value of the multilevel electrical write pulse is approximately equal to twice the magnitude of the steady state value of the multilevel electrical write pulse.

5. The method of claim 1 wherein the disc drive comprises a plurality of magnetic disc surfaces and wherein:

step(a) comprises storing a magnitude and a duration of a peak value of a multilevel electrical write pulse for each of a plurality of transducers in the disc drive;

step(b) comprises retrieving the magnitude and the duration of the peak value of the multilevel write pulse for a respective one of the transducers from the computer memory when that transducer is selected for writing;

step(c) comprises positioning the respective transducer adjacent a respective one of the magnetic disc surfaces;

step (d) comprises providing the multilevel electrical write pulse to the respective transducer, the multilevel write pulse having a steady state value of lesser magnitude than the peak value, the steady state value occurring after the peak value; and step (e) comprises providing a reversed polarity multilevel electrical write pulse to the respective transducer which is substantially symmetrical to the multilevel electrical write pulse for the respective transducer when a change in a polarity of data is desired.

6. A disc drive comprising:

a first magnetic disc surface;

a first transducer, adapted to write data to the first magnetic disc surface;

a computer data storage device adapted to store a magnitude and a duration of a peak value of a multilevel electrical write pulse for the first transducer; and a first write circuit adapted to communicate with the computer storage device and to provide the multilevel electrical write pulse to the first transducer, the multilevel write pulse having a steady state value of lesser magnitude than the peak value, the steady state value occurring after the peak value, and further adapted to provide a reversed polarity multilevel electrical write pulse to the first transducer which is substantially symmetrical to the multilevel electrical write pulse when a change in a polarity of data is desired.

7. The apparatus of claim 6 wherein the disc drive further comprises:

a second magnetic disc surface;

a second transducer, adapted to write data to the second magnetic disc surface, wherein the computer data storage device is adapted to store a magnitude and a duration of a peak value of a multilevel electrical write pulse for the second transducer; and a second write circuit adapted to communicate with the computer storage device and to provide the multilevel electrical write pulse to the second transducer, the multilevel write pulse having a steady state value of lesser magnitude than the peak value, the steady state value occurring after the peak value, and further adapted to provide a reversed polarity multilevel electrical write pulse to the second transducer which is substantially symmetrical to the multilevel electrical write pulse for the second transducer when a change in a polarity of data is desired.

* * * * *